Dec. 16, 1941.  L. W. DADLOW  2,266,685
POULTRY NEST
Filed May 21, 1940   2 Sheets-Sheet 1
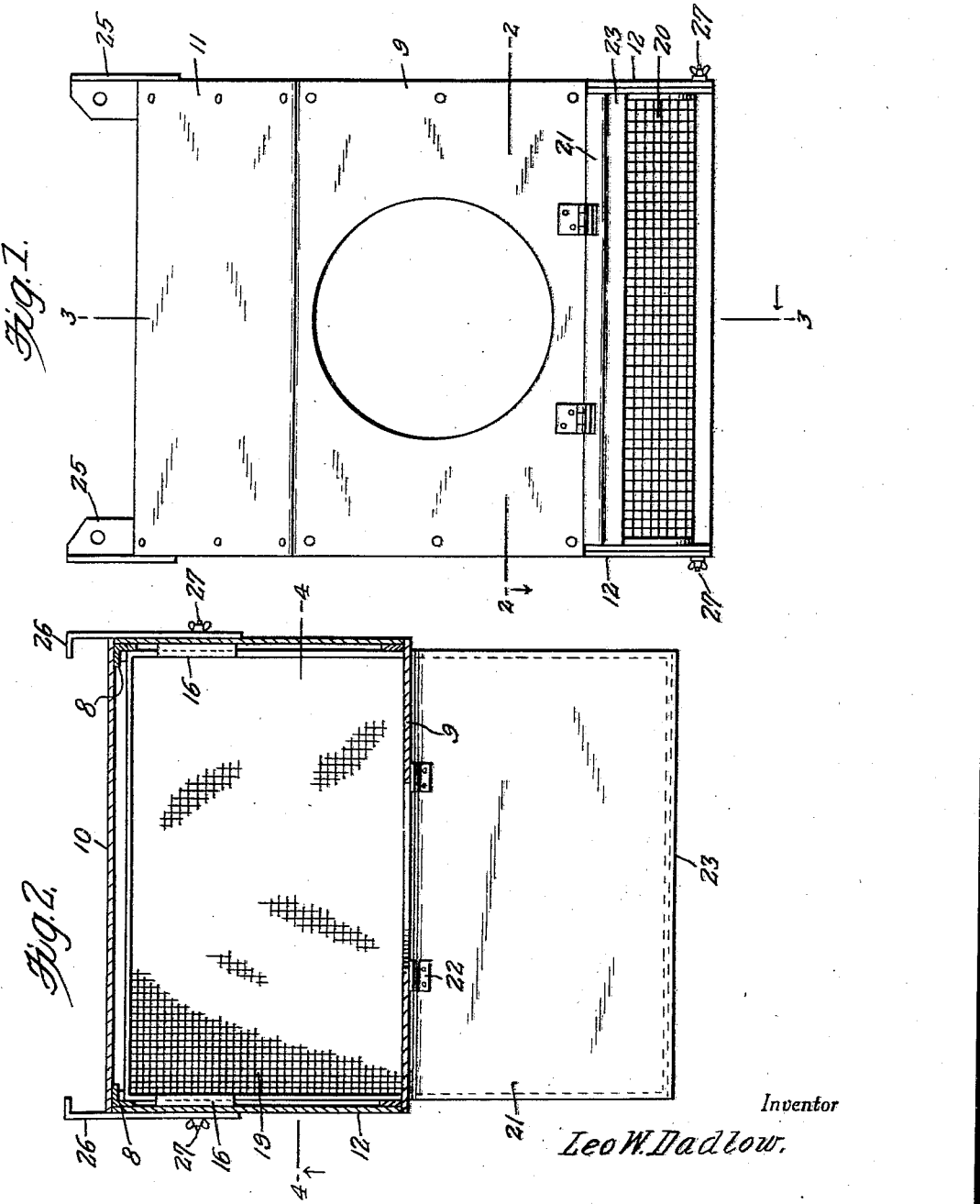
Inventor
Leo W. Dadlow.
By Clarence A. O'Brien
Attorney Dec. 16, 1941. L. W. DADLOW 2,266,685
POULTRY NEST
Filed May 21, 1940 2 Sheets-Sheet 2
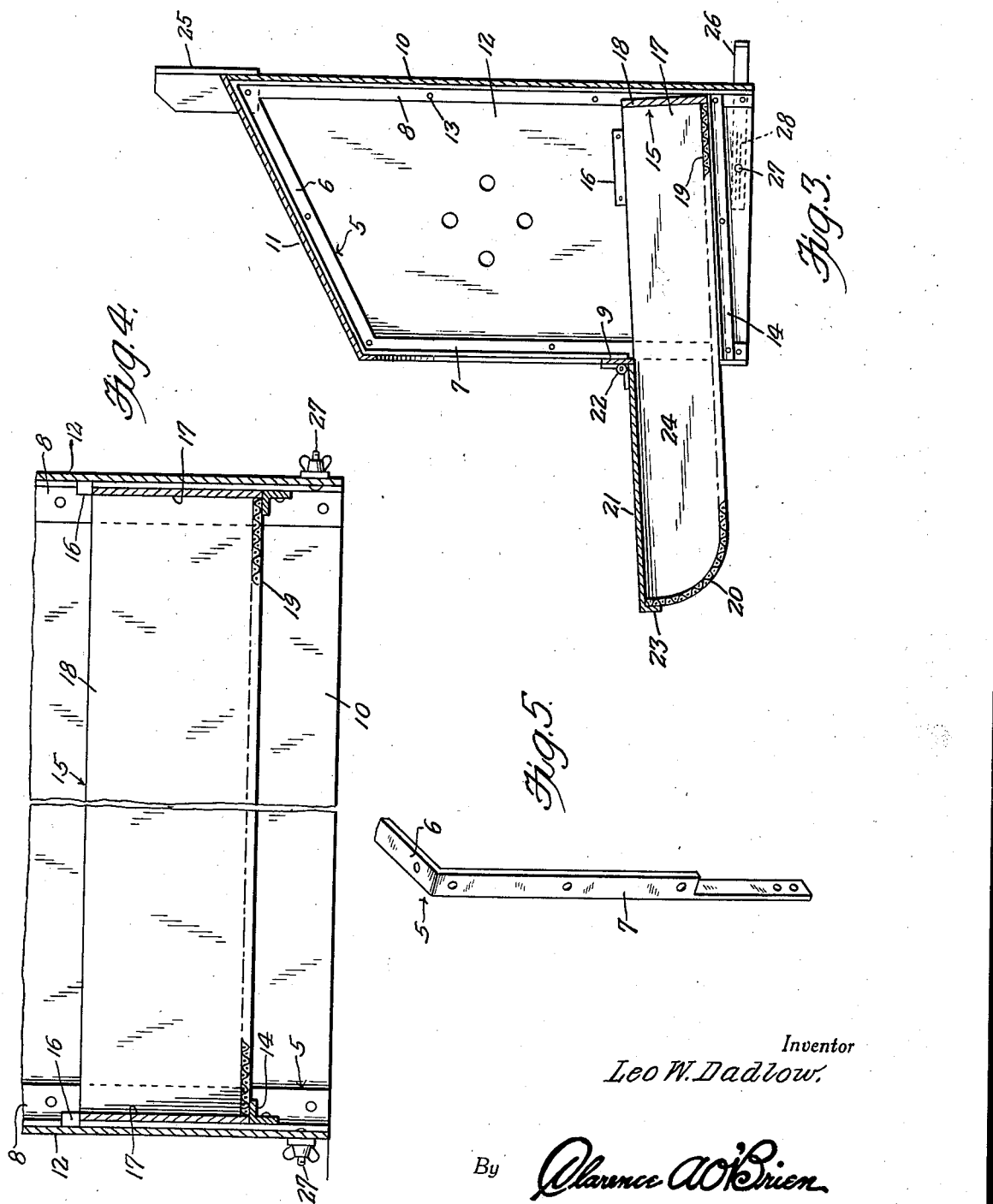
Inventor
Leo W. Dadlow.
By Clarence A. O'Brien
Attorney Patented Dec. 16, 1941

2,266,685

UNITED STATES PATENT OFFICE 2,266,685

POULTRY NEST

Leo W. Dadlow, La Porte, Ind.

Application May 21, 1940, Serial No. 336,427

1 Claim. (Cl. 119—48)

This invention appertains to new and useful improvements in poultry nests and more particularly to nests of the type in which the egg is secreted from the hen.

The principal object of the present invention is to provide a nest of the type which will permit a laid egg to roll to a position where it cannot be reached and eaten by the hen.

Another important object of the invention is to provide a poultry nest which can be readily cleaned and kept in order with a minimum amount of effort on the part of the attendant.

Other objects and advantages of the invention will become apparent to the reader of the following specification.

In the drawings:

Figure 1 is a front elevational view of the nest.

Figure 2 is a horizontal sectional view taken substantially on the line 2—2 of Figure 1.

Figure 3 is a vertical sectional view taken substantially on the line 3—3 of Figure 1.

Figure 4 is an enlarged fragmentary vertical sectional view taken substantially on the line 4—4 of Figure 2.

Figure 5 is a fragmentary perspective view showing one of the leg members of the frame.

Referring to the drawings wherein like numerals designate like parts, it can be seen that the nest housing includes a pair of side frames 5—5, each of angle iron construction and consisting of an upper inclined portion 6 and depending front and rear parallel legs 7 and 8. To the front legs 7 is secured a front wall 9 while the rear legs 8 have the back wall 10 secured thereto. The slanting roof 11 is secured to the inclined portion 6 of the frames 5. Numeral 12 denotes a side wall for each side of the housing and these are secured by suitable means 13 to the frames 5.

An inclined angle iron member 14 bridges the legs 7 and 8 of each frame 5 adjacent the lower portions thereof and these angle members 14 serve to support the nest box generally referred to by numeral 15. Inclinedly disposed cleats 16 are provided on the inner sides of the side walls 12 and under these can ride the upper edges of the nest box 15.

The nest box is made up of the side walls 17 and a back wall 18. The bottom of the box 15 consists of the elongated sheet of foraminous material denoted by numeral 19 and this extends from the rear wall 18 forwardly and is curved upwardly at its forward portion as at 20, this portion and the side edges of the bottom 19 being secured to the lower and forward edges of the side walls 17, the forward portions of the side walls 17 being of arcuate shape as shown in Figure 3.

A lid 21 is hingedly secured as at 22, to the lower portion of the front wall 9, and of course as shown in Figure 3, portions of the flanges of the legs 7 are removed to accommodate the nest box 15. The free edge portion of the lid 21 is provided with a downwardly disposed flange 23, which when in overlapping position with respect to the forward end of the bottom 19 serves to prevent outward displacement of the nest box 15.

When it is desired to remove the box 15 to permit access thereto, the lid 21 can be raised and the box 15 drawn outwardly. When it is desired to merely remove an egg, the lid 21 can be lifted and the egg taken out of the egg concealing compartment 24.

Brackets 25 are provided at the upper corners of the housing to permit attachment of the nest to a wall or other structure, and additional bracket arms 26 are provided at the lower corners of the nest and connected to the side walls 12 by bolts and slot connections 27 and 28, respectively.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A poultry nest comprising a box-like structure having a slidable nest box partly disposed in the housing, and a lid for the outer portion of the box, said box being inclinedly disposed in the housing, said lid being provided with a lip on the outer end thereof for engaging the outer end of the box and serving as a stop for the latter.

LEO W. DADLOW.